United States Patent
Miyata

(10) Patent No.: US 11,915,497 B2
(45) Date of Patent: Feb. 27, 2024

(54) CONTROL DEVICE, CONTROL METHOD AND PROGRAM

(71) Applicant: Toyota Jidosha Kabushiki Kaisha, Toyota (JP)

(72) Inventor: Ai Miyata, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 72 days.

(21) Appl. No.: 17/402,956

(22) Filed: Aug. 16, 2021

(65) Prior Publication Data

US 2022/0114376 A1    Apr. 14, 2022

(30) Foreign Application Priority Data

Oct. 12, 2020    (JP) ................ 2020-172192

(51) Int. Cl.
| | |
|---|---|
| *G06K 9/00* | (2022.01) |
| *G06V 20/59* | (2022.01) |
| *G06T 7/00* | (2017.01) |
| *G06V 20/56* | (2022.01) |
| *G06V 40/10* | (2022.01) |
| *G06Q 50/30* | (2012.01) |
| *G06Q 10/0631* | (2023.01) |
| *G06Q 30/018* | (2023.01) |

(52) U.S. Cl.
CPC .......... *G06V 20/597* (2022.01); *G06T 7/0004* (2013.01); *G06V 20/56* (2022.01); *G06V 40/10* (2022.01); *G06Q 10/06315* (2013.01); *G06Q 30/018* (2013.01); *G06Q 50/30* (2013.01); *G06T 2207/30108* (2013.01); *G06T 2207/30196* (2013.01); *G06T 2207/30268* (2013.01)

(58) Field of Classification Search
CPC ...... G06V 20/597; G06V 20/56; G06V 40/10; G06V 20/59; G06T 7/0004; G06T 2207/30108; G06T 2207/30196; G06T 2207/30268; G06T 7/00; G06Q 10/06315; G06Q 30/018; G06Q 50/30; G06Q 10/0639

See application file for complete search history.

(56) References Cited

U.S. PATENT DOCUMENTS

| | | | |
|---|---|---|---|
| 2019/0276031 A1* | 9/2019 | Hirose | B60W 50/0098 |
| 2019/0287166 A1* | 9/2019 | Mitsumaki | G07C 5/085 |
| 2020/0160076 A1 | 5/2020 | Suzuki et al. | |
| 2020/0175783 A1* | 6/2020 | Adams | G07C 5/0891 |
| 2020/0226858 A1* | 7/2020 | Fujisawa | G01R 31/007 |
| 2021/0081906 A1* | 3/2021 | Shimada | G06Q 30/0207 |

FOREIGN PATENT DOCUMENTS

| | | |
|---|---|---|
| JP | 2019-164469 A | 9/2019 |
| JP | 2020-086762 A | 6/2020 |
| JP | 2020-113076 A | 7/2020 |

\* cited by examiner

*Primary Examiner* — Dhaval V Patel
(74) *Attorney, Agent, or Firm* — Dinsmore & Shohl LLP

(57) ABSTRACT

A control device includes a control unit configured to: acquire a first image, a second image and report information, the first image being an image resulting from photographing a vehicle before a user gets in the vehicle, the second image being an image resulting from photographing the vehicle after the user gets out of the vehicle, the report information being relevant to a change in a state of the vehicle and being reported by the user; detect the change in the state of the vehicle based on the first image and the second image; and evaluate the user based on the detected change and the report information.

11 Claims, 9 Drawing Sheets

FIG. 4

| LINE NUMBER | VEHICLE | USER | RIDE ORDER | FIRST IMAGE | SECOND IMAGE | DETECTION RESULT |
|---|---|---|---|---|---|---|
| 1 | VEHICLE 40A | USER 11A | 1 | NO DAMAGE | DAMAGE (SEATING SURFACE OF PASSENGER'S SEAT) | INCREASE IN DAMAGE |
| 2 | VEHICLE 40A | USER 11B | 2 | DAMAGE (SEATING SURFACE OF PASSENGER'S SEAT) | DAMAGE (SEATING SURFACE OF PASSENGER'S SEAT) | NO CHANGE |
| 3 | VEHICLE 40A | USER 11C | 3 | DAMAGE (SEATING SURFACE OF PASSENGER'S SEAT) | DAMAGE (SEATING SURFACE OF PASSENGER'S SEAT AND SEATING SURFACE OF DRIVER'S SEAT) | INCREASE IN DAMAGE |
| 4 | VEHICLE 40B | USER 11D | 1 | NO DAMAGE | NO DAMAGE | NO CHANGE |
| ... | ... | ... | ... | ... | ... | ... |

FIG. 6

| LINE NUMBER | VEHICLE | USER | STATE BEFORE USE | STATE AFTER USE |
|---|---|---|---|---|
| 1 | VEHICLE 40A | USER 11A | NO DAMAGE | DAMAGE (SEATING SURFACE OF PASSENGER'S SEAT) |
| 2 | VEHICLE 40A | USER 11B | DAMAGE (SEATING SURFACE OF PASSENGER'S SEAT) | DAMAGE (SEATING SURFACE OF PASSENGER'S SEAT) |
| 3 | VEHICLE 40A | USER 11C | — (NO REPORT) | — (NO REPORT) |
| 4 | VEHICLE 40B | USER 11D | DAMAGE (DOOR GLASS ON PASSENGER'S SEAT SIDE) | DAMAGE (DOOR GLASS ON PASSENGER'S SEAT SIDE) |
| ... | ... | ... | ... | ... |

CONTROL DEVICE, CONTROL METHOD AND PROGRAM

CROSS-REFERENCE TO RELATED APPLICATION

This application claims priority to Japanese Patent Application No. 2020-172192 filed on Oct. 12, 2020, incorporated herein by reference in its entirety.

BACKGROUND

1. Technical Field

The present disclosure relates to a control device, a control method and a program.

2. Description of Related Art

Conventionally, in car-sharing services, the evaluation of users is performed. For example, in a technology disclosed in Japanese Unexamined Patent Application Publication No. 2019-164469, after a precedent user uses a vehicle, a subsequent user that gets in the same vehicle evaluates the precedent user.

SUMMARY

However, there is still room for improvement in the technology for evaluating the user in the car-sharing service.

An object of the present disclosure is to enhance the quality of the evaluation of the user in the car-sharing service.

A control device according to the present disclosure includes a control unit configured to:

acquire a first image, a second image and report information, the first image being an image resulting from photographing a vehicle before a user gets in the vehicle, the second image being an image resulting from photographing the vehicle after the user gets out of the vehicle, the report information being relevant to a change in a state of the vehicle and being reported by the user;

detect the change in the state of the vehicle based on the first image and the second image; and evaluate the user based on the detected change and the report information.

A control method according to the present disclosure includes: acquiring a first image, a second image and report information, the first image being an image resulting from photographing a vehicle before a user gets in the vehicle, the second image being an image resulting from photographing the vehicle after the user gets out of the vehicle, the report information being relevant to a change in a state of the vehicle and being reported by the user;

detecting the change in the state of the vehicle based on the first image and the second image; and evaluating the user based on the detected change and the report information.

A program according to the present disclosure causes a computer to execute an operation including:

acquiring a first image, a second image and report information, the first image being an image resulting from photographing a vehicle before a user gets in the vehicle, the second image being an image resulting from photographing the vehicle after the user gets out of the vehicle, the report information being relevant to a change in a state of the vehicle and being reported by the user;

detecting the change in the state of the vehicle based on the first image and the second image; and evaluating the user based on the detected change and the report information.

With the embodiment, it is possible to enhance the quality of the evaluation of the user in the car-sharing service.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 4 is a diagram for describing a change that is detected by the control device according to the embodiment;

FIG. 6 is a diagram for describing a report from a user according to the embodiment;

DETAILED DESCRIPTION OF EMBODIMENTS

Figure 1:
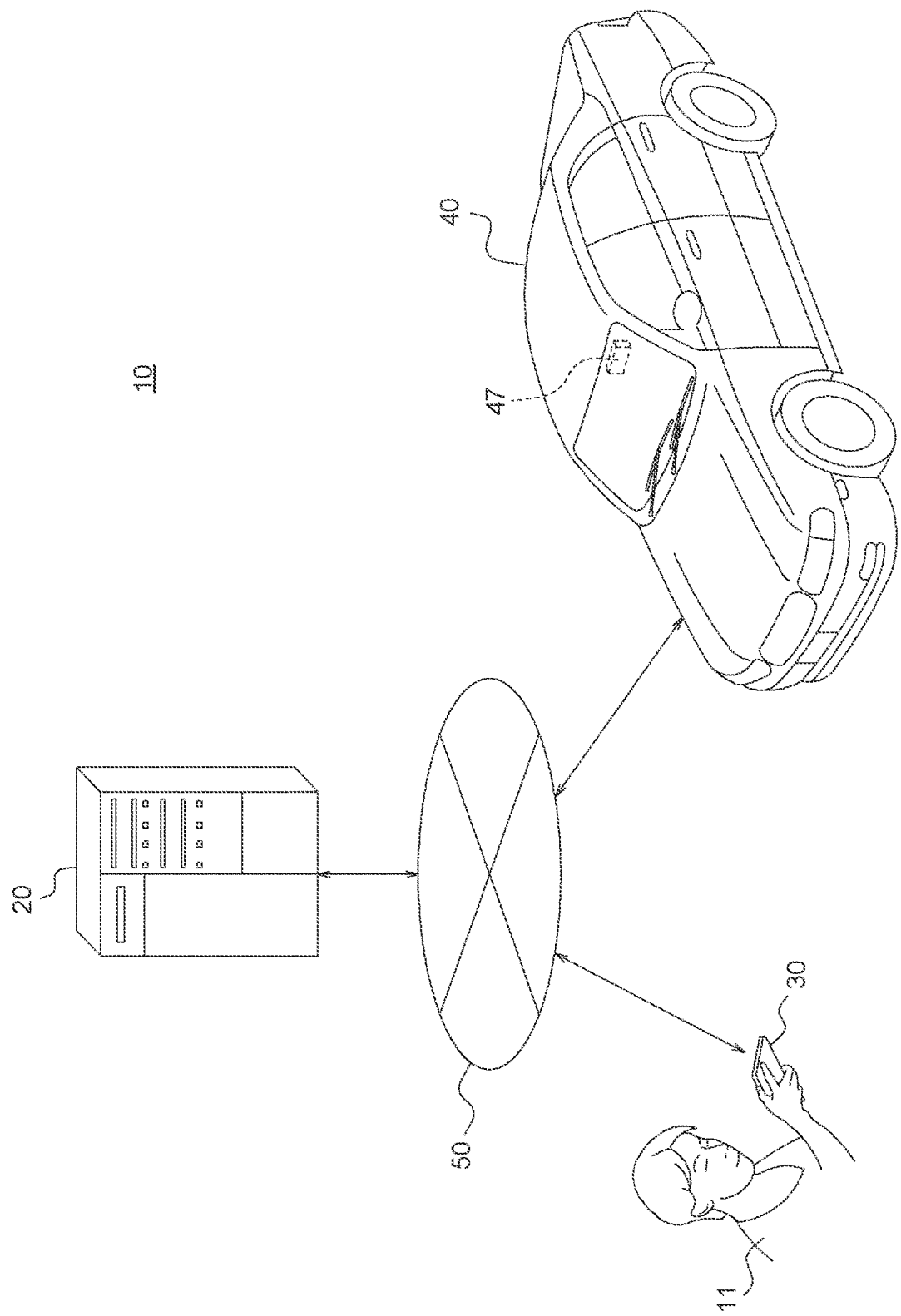
FIG. 1 is a diagram showing a configuration of a system according to an embodiment.

An embodiment of the present disclosure will be described below with reference to the drawings. In the drawings, the same or corresponding parts are denoted by same reference characters. In the description of the embodiment, descriptions of the same or corresponding parts will be omitted or simplified when appropriate.

With reference to FIG. 1, a configuration of a system 10 according to the embodiment will be described.

The system 10 according to the embodiment includes a control device 20, one or more terminal devices 30, and one or more vehicles 40. For the simplification of the description, FIG. 1 illustrates one terminal device 30 and one vehicle 40. However, in the system 10, the number of terminal devices 30 and the number of vehicles 40 are not limited to one, and may be freely decided.

In the following description, when a vehicle 40A and a vehicle 40B are not particularly distinguished, the vehicle 40A and the vehicle 40B are collectively referred to as a vehicle 40. Further, when a user 11A to a user 11D are not particularly distinguished, the user 11A to the user 11D are collectively referred to as a user 11.

The control device 20 can communicate with the terminal device 30 and the vehicle 40 through a network 50.

The network 50 includes the Internet, at least one WAN, at least one MAN, or a combination of them. The "WAN" is an abbreviation of wide area network. The "MAN" is an abbreviation of metropolitan area network. The network 50 may include at least one wireless network, at least one optical network, or a combination of them. Examples of the wireless network include an ad-hoc network, a cellular network, a wireless LAN, a satellite communication network and a terrestrial microwave network. The "LAN" is an abbreviation of local area network.

The control device 20 is installed in a facility such as a data center. For example, the control device 20 is a server that belongs to a cloud computing system or another computing system. For example, the control device 20 may be installed in an office of a business operator that provides a car-sharing service. In the embodiment, the control device 20 has both the function of a device that manages the operation of the car-sharing service and the function of a device that evaluates the user 11 as described below in detail, but is not limited to this form. The control device 20 may be configured such that the device that manages the operation of the car-sharing service and the device that evaluates the user 11 are separate devices and the two devices communicate with each other.

The terminal device 30 is used by the user 11 that uses the car-sharing service. For example, the terminal device 30 is a mobile device such as a cellular phone, a smartphone, a wearable device and a tablet, or a PC. The "PC" is an abbreviation of personal computer.

For example, the vehicle 40 is an arbitrary kind of automobile such as a gasoline vehicle, a diesel vehicle, an HV, a PHV, an EV or an FCV. The "HV" is an abbreviation of hybrid vehicle. The "PHV" is an abbreviation of plug-in hybrid vehicle. The "EV" is an abbreviation of electric vehicle. The "FCV" is an abbreviation of fuel cell vehicle. In the embodiment, the vehicle 40 is driven by a driver, but the driving of the vehicle 40 may be automated at an arbitrary level. For example, the level of the automation is one of Level 1 to Level 5 that are defined by SAE. The "SAE" is an abbreviation of "Society of Automotive Engineers". The vehicle 40 may be a MaaS-dedicated vehicle. The "MaaS" is an abbreviation of Mobility as a Service. The vehicle 40 includes a vehicle that is used in the car-sharing service. In the embodiment, the user 11 rides in the vehicle 40.

With reference to FIG. 1, a brief summary of the embodiment will be described.

In the system 10 shown in FIG. 1, the control device 20 acquires a first image resulting from photographing the vehicle 40 before the user 11 gets in the vehicle 40, a second image resulting from photographing the vehicle 40 after the user 11 gets out of the vehicle 40, and report information that is relevant to a change in the state of the vehicle and that is reported by the user 11. The control device 20 detects the change in the state of the vehicle 40 based on the first image and the second image. The control device 20 evaluates the user 11 based on the detected change and the report information. The change includes an appearance of a damage of the vehicle 40.

The term "first image" is an image resulting from photographing the vehicle 40 before the user 11 gets in the vehicle 40. The term "second image" is an image resulting from photographing the vehicle 40 after the user 11 gets out of the vehicle 40. In the embodiment, each of the first image and the second image is an image resulting from photographing the interior of the vehicle 40. Without being limited to this, each of the first image and the second image may be an image resulting from photographing the external appearance of the vehicle 40. Specifically, the term "interior of the vehicle 40" is the interior of a vehicle cabin of the vehicle 40. The number of first images and the number of second images may be freely decided. Each of the first image and the second image may be an image resulting from photographing a plurality of portions in the interior of the vehicle 40. Each of the first image and the second image may be a monochrome image, or may be a color image. For example, the resolution of each of the first image and the second image is a resolution that makes it possible to recognize the damage of a car trim in the interior of the vehicle 40. The term "change" is a difference between the first image and the second image, and includes an appearance of the damage of car trim in the vehicle 40. For example, the damage includes a scratch and dirt on an instrument panel, a seat, a windshield, a door glass, or the like, a stain due to spill of liquid, and others. The change is not limited to these, and may include a difference in the position of a seat or the position of a backrest, for example. The term "report information" is information that is generated by the terminal device 30 based on the input by the user 11. The report information includes a user identifier of the user 11 and a report from the user 11 about the change in the state of the interior of the vehicle 40. The report information may include, for example, an answer to a questionnaire about the car-sharing service. The report information is sent from the terminal device 30 to the control device 20, as described below in detail.

Figure 2:
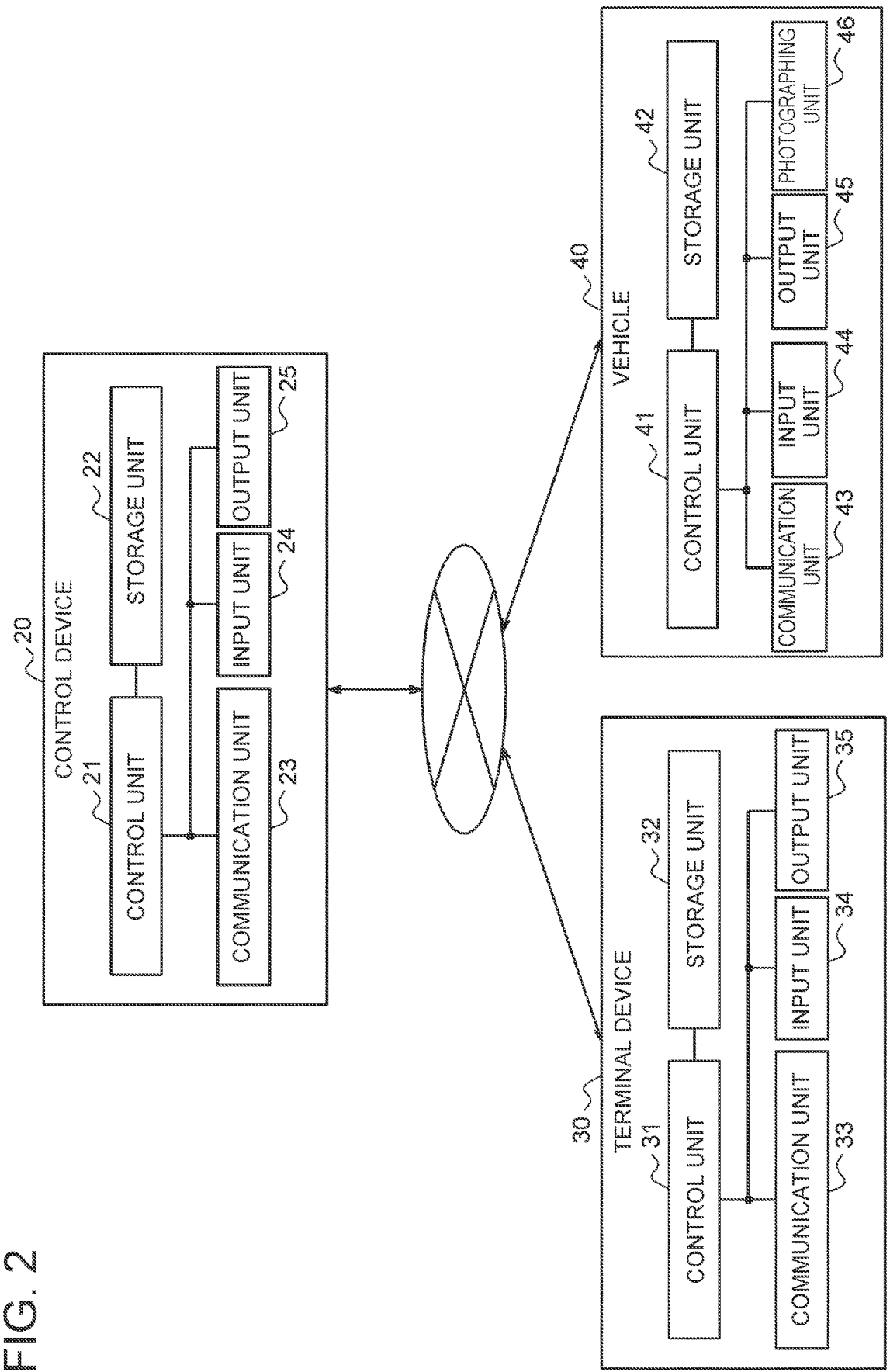
FIG. 2 is a block diagram showing configurations of a control device, a terminal device and a vehicle according to the embodiment.

With reference to FIG. 2, the configuration of the control device 20 according to the embodiment will be described. The control device 20 includes a control unit 21, a storage unit 22, a communication unit 23, an input unit 24 and an output unit 25.

The control unit 21 includes at least one processor, at least one dedicated circuit, or a combination of them. The processor is a general-purpose processor such as a CPU or a GPU, or a dedicated processor for a particular process. The "CPU" is an abbreviation of central processing unit. The "GPU" is an abbreviation of graphics processing unit. For example, the dedicated circuit is an FPGA or an ASIC. The "FPGA" is an abbreviation of field-programmable gate array. The "ASIC" is an abbreviation of application specific integrated circuit. The control unit 21 executes processes relevant to the operation of the control device 20, while controlling each unit of the control device 20.

The control unit 21 manages the operation of the car-sharing service. The operation management of the car-sharing service will be briefly described below.

First, the user 11 makes a reservation for the car-sharing service, through the terminal device 30. The terminal device 30 sends information such as a scheduled date and time for use start and a scheduled date and time for use end, which are input by the user 11, and the user identifier of the user 11, to the control device 20. The control unit 21 of the control device 20 receives the information sent from the terminal device 30, through the communication unit 23. Based on the received information, the control unit 21 creates a reservation information table indicating the reservation status of the car-sharing service, while referring to a user information table indicating information about the user 11 and a vehicle information table indicating information about the vehicle 40. The user information table and the vehicle information table are stored in the storage unit 22. In the "user information table", the user identifier and the total possessed point of the user 11 are recorded so as to be associated with each other. In addition, the user information table may include information about the age, sex, address and others of the user 11. For example, the user information table is created based on information provided by the user 11, when the user 11 uses the car-sharing service for the first time. In the "vehicle information table", a vehicle identifier of the vehicle 40 and the parking place of the vehicle 40 are recorded so as to be associated with each other. The "reservation information table" includes information such as the user identifier, the vehicle identifier, the release status of authentication information, a lending place and returning place for the vehicle 40, the scheduled date and time for use start and the scheduled date and time for use end. The control unit 21 stores the reservation information table created in this way, in the storage unit 22.

The actual use of the vehicle 40 in the car-sharing service is performed as described below. First, the control unit 21 sends the authentication information that is valid only in a period from the scheduled date and time for use start to the scheduled date and time for use end, to the terminal device 30 and the vehicle 40. The control unit 21 updates the release status of the authentication information in the reservation information table, so as to show that the authentication information is released. The terminal device 30 and the vehicle 40 receive the authentication information. The terminal device 30 sends the authentication information to the vehicle 40, in response to an input by the user 11. The vehicle 40 collates the authentication information received from the terminal device 30, and allows the unlocking of a door, the start of an engine, and others. Thereby, the vehicle 40 can be used.

When the user 11 ends the use of the vehicle 40, the user 11 inputs a notice of the end of the use, to the terminal device 30. The terminal device 30 sends end notice information for giving the notice of the end of the use, to the control device 20. The terminal device 30 may send the end notice information also to the vehicle 40. The control unit 21 of the control device 20 receives the end notice information through the communication unit 23. The control unit 21 determines whether the current time is within the scheduled date and time for use end, by referring to the reservation information table, and decides a fee and others. Further, the control unit 21 decides the number of points for the user 11, and updates the total possessed point of the user 11 in the user information table, as described later in detail. The control unit 21 sends an instruction to invalidate the authentication information, to the vehicle 40, through the communication unit 23. The vehicle 40 receives the instruction, and invalidates the authentication information in response to the instruction. The control unit 21 updates the release status of the authentication information in the reservation information table, so as to show that the release is ended.

In this way, the control unit 21 manages the operation of the car-sharing service.

The control unit 21 acquires the first image and second image photographed by a photographing unit 46, from the vehicle 40, by receiving the first image and the second image through the communication unit 23. The control unit 21 compares the acquired first image and second image, and detects the change in the state of the interior of the vehicle 40. The control unit 21 may detect the change by analyzing the first image and the second image using a well-known image analysis technology. For example, the control unit 21 may detect the change by comparing luminance values of pixels of the images. For example, the control unit 21 may detect the change based on a condition generated by machine learning. The control unit 21 stores information indicating a result of the comparison between the first image and the second image, in the storage unit 22.

Figure 3A:
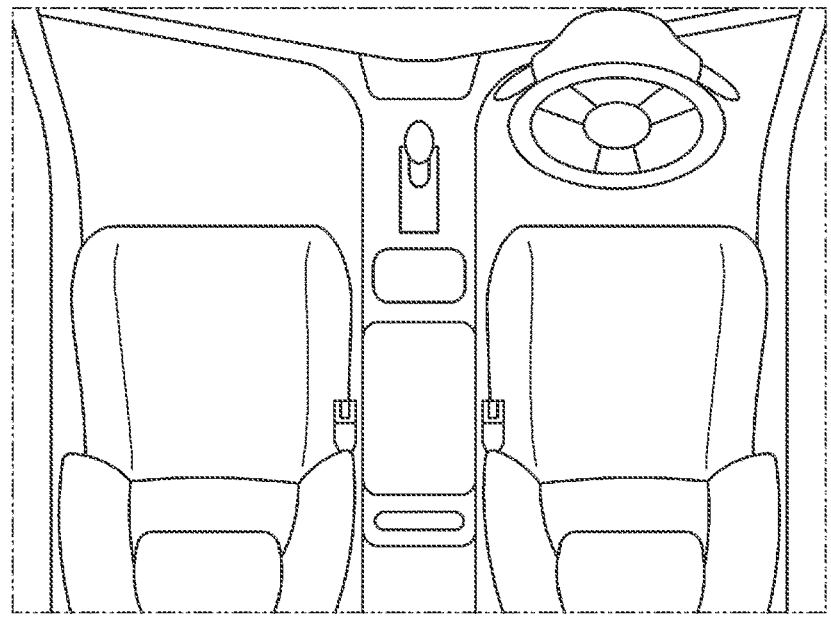
FIG. 3A is a diagram showing an example of a first image according to the embodiment.
Figure 3B:
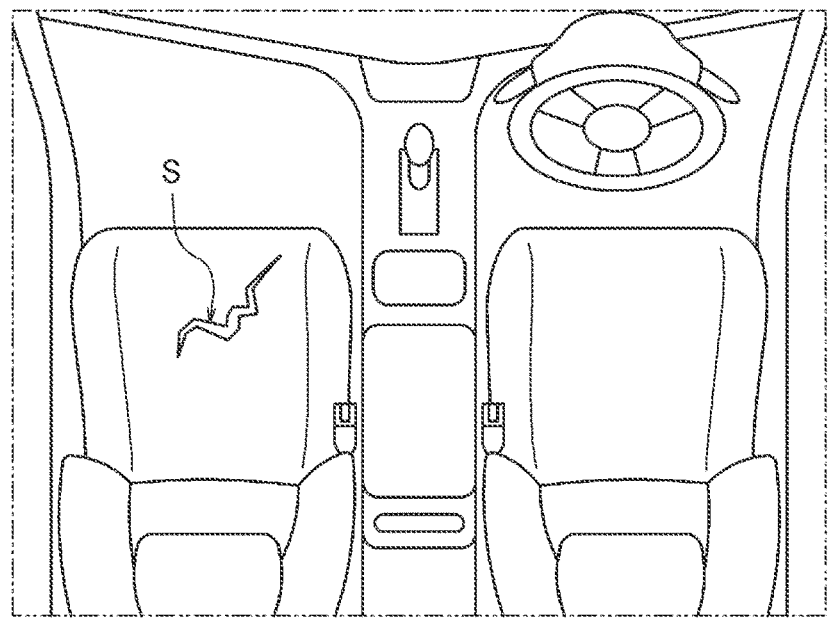
FIG. 3B is a diagram showing an example of a second image according to the embodiment.

FIG. 3A and FIG. 3B show examples of the first image and second image photographed by the photographing unit 46 and acquired by the control unit 21. FIG. 3A and FIG. 3B show images resulting from photographing a driver's seat and passenger's seat of the vehicle 40A, from a ceiling surface. FIG. 3A shows the first image photographed before the user 11A gets in the vehicle 40A. FIG. 3B shows the second image photographed after the user 11A gets out of the vehicle 40A. The control unit 21 recognizes a scratch S in the second image. The scratch S is not recognized in the first image. As a result of the comparison between the first image and the second image, the control unit 21 detects a change, that is, an increase in damage as the state of the interior of the vehicle 40.

FIG. 4 is a diagram for describing the change detected by the control unit 21. In FIG. 4, the result of the comparison is shown in a table format, but the format is not limited to this as long as the same content is shown. On the leftmost row in FIG. 4, line numbers are put for convenience of description. On each line in FIG. 4, pieces of information are recorded so as to be associated with each other. When the control unit 21 acquires the first image and the second image from the vehicle 40, the control unit 21 acquires also the vehicle identifier of the vehicle 40. The control unit 21 refers to the reservation information table stored in the storage unit 22, and confirms the user identifier corresponding to the acquired vehicle identifier. Thereby, the control unit 21 can associate the result of the comparison between the first image and the second image, the information about the user 11 and the information about the vehicle 40.

For example, the first line, the second line and the third line in FIG. 4 indicate that the user 11A, the user 11B and the user 11C rode in the vehicle 40A in this order. The first line in FIG. 4 indicates that a damage not recognized from the first image was recognized from the second image. Specifically, a damage on the seating surface of the passenger's seat was recognized. In this example, the damage is the scratch S shown in FIG. 3B. From the first line in FIG. 4, it is found that the control unit 21 detected the change, that is, the increase in damage as the state of the interior of the vehicle 40A. The second line in FIG. 4 indicates that the damage on the seating surface of the passenger's seat was recognized from the first image and the same damage was recognized also from the second image. From the second line in FIG. 4, it is found that the control unit 21 detected that there was no change as the state of the interior of the vehicle 40A. The third line in FIG. 4 indicates that the damage on the seating surface of the passenger's seat was recognized from the first image and a damage on the seating surface of the driver's seat was further recognized from the second image. From the record on the third line in FIG. 4, it is found that the control unit 21 detected the change, that is, the increase in damage as the state of the interior of the vehicle 40A. The fourth line in FIG. 4 indicates that no damage was recognized from the first image and no damage was recognized from the second image. From the record on the fourth line in FIG. 4, it is found that the control unit 21 detected that there was no change as the state of the interior of the vehicle 40B. The change that is detected by the control unit 21 is not limited to the increase in damage, and can include a change in the place of an object in the interior of the vehicle 40, for example.

The control unit 21 acquires the report information from the terminal device 30. Specifically, the control unit 21 acquires the report information by receiving the report information through the communication unit 23. The control unit 21 stores the acquired report information in the storage unit 22.

Figure 5:
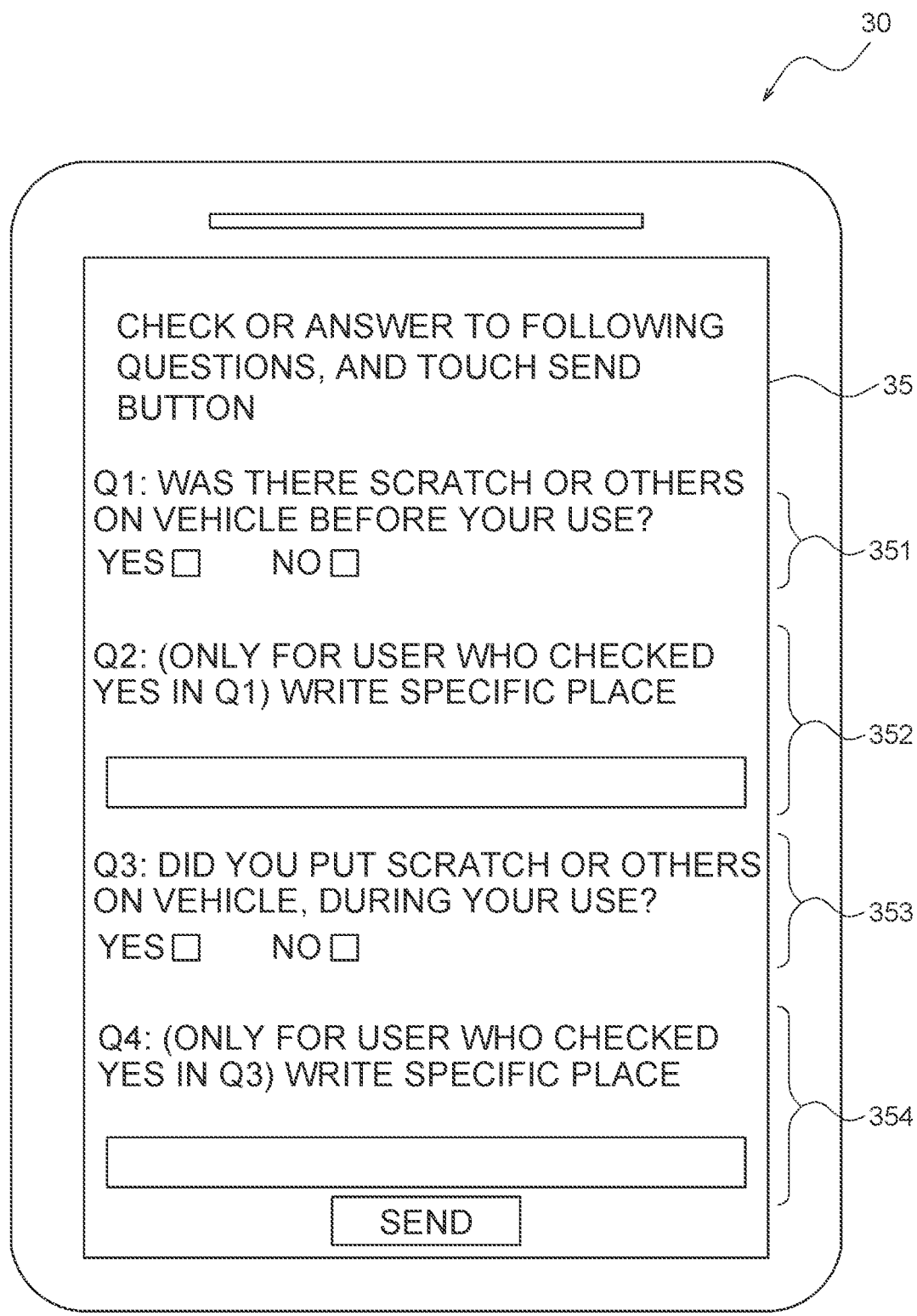
FIG. 5 is a diagram showing an example of a screen that is displayed on an output unit of the terminal device according to the embodiment.

Here, the report information will be described. The report information is created by the terminal device 30, based on the input to the terminal device 30 by the user 11. FIG. 5 shows an example of a screen for input that is displayed on an output unit 35 of the terminal device 30. The user 11 inputs a report about the state of the interior of the vehicle 40 before the use of the vehicle 40, to an answer section 351 and an answer section 352 in FIG. 5, and inputs a report about the state of the interior of the vehicle 40 after the use of the vehicle 40, to an answer section 353 and an answer section 354. A control unit 31 of the terminal device 30 creates the report information based on the input information. The created report information includes the user identifier of the user 11, in addition to the report from the user 11. The control unit 31 sends the report information to the control device 20.

In FIG. 5, each of the answer section 351 and the answer section 353 has a checkbox-type input format, and each of the answer section 352 and the answer section 354 has a text-input-type input format. After the control unit 21 acquires the report information, the control unit 21 can extract the place of the damage in the vehicle 40, based on information of texts input to the answer section 352 and the answer section 354. The method for the input of the report by the user 11 is not limited to the format shown in FIG. 5, and may be freely set. In the case where there is no input in any answer section, the report is not included in the report information. For example, when a certain time lapses after the display of the screen in FIG. 5, the terminal device 30 may create the report information that does not include the report, and may send the report information to the control device 20.

FIG. 6 is a diagram for the report from the user 11 about the change in the state of the interior of the vehicle 40. In FIG. 6, the report from the user 11 is shown in a table format, but the format is not limited to this as long as the same content is shown. On the leftmost row in FIG. 6, line numbers are put for convenience of description. On each line in FIG. 6, pieces of information are recorded so as to be associated with each other. When the control unit 21 acquires the report information from the terminal device 30, the control unit 21 acquires also the user identifier of the user 11. The control unit 21 refers to the reservation information table stored in the storage unit 22, and confirms the vehicle identifier corresponding to the acquired user identifier. Thereby, the control unit 21 can associate the report from the user 11, the information about the user 11, and the information about the vehicle 40.

For example, the first line in FIG. 6 indicates a report from the user 11A that rode in the vehicle 40A. Information indicated on a row with a title "STATE BEFORE USE" in FIG. 6 corresponds to the information input to the answer section 351 and the answer section 352 in FIG. 5. Information indicated on a row with a title "STATE AFTER USE" corresponds to the information input to the answer section 353 and the answer section 354 in FIG. 5. For example, suppose that the user 11A input the check to the NO box in the answer section 351 in FIG. 5, input the check to the YES box in the answer section 353, input a text "the seating surface of the passenger's seat" to the answer section 354, and sent the report information. The control unit 21 acquires the report information, and records the report information as shown on the first line in FIG. 6. From the first line in FIG. 6, it is found that the user 11A reported "there was no damage before the use of the vehicle 40A, but there was a damage on the seating surface of the passenger's seat after the use". In this example, the damage is the scratch S shown in FIG. 3B.

Further, for example, suppose that the user 11B input the check to the YES box in the answer section 351 in FIG. 5, input the text "the seating surface of the passenger's seat" to the answer section 352, input the check to the NO box in the answer section 353, and sent the report information. The control unit 21 acquires the report information, and records the report information as shown on the second line in FIG. 6. From the second line in FIG. 6, it is found that the user 11B reported that there had already been a damage on the seating surface of the passenger's seat before the use of the vehicle 40A and the damage was still on the seating surface of the passenger's seat after the use.

Further, for example, suppose that the user 11C did not perform input to any answer section in FIG. 5 and the terminal device 30 sent the report information to the control device 20 after the lapse of a certain time. The control unit 21 acquires the report information, and records the report information as shown on the third line in FIG. 6. From the third line in FIG. 6, it is found that the user 11C did not perform the report about the change in the state of the interior of the vehicle 40A after the ride. From the third line in FIG. 6, the control unit 21 can determine that the acquired report information does not include the report about the change in the state of the interior of the vehicle 40.

The control unit 21 may store the detected change in the state of the interior of the vehicle 40 and the report from the user 11 in the storage unit 22, in association with the reservation information table. Thereby, for example, a staff of the business operator that provides the car-sharing service can investigate the history of the appearance of the damage in a particular vehicle 40, by referring to the reservation information table.

As described below, the control unit 21 evaluates the user 11 based on the detected change in the state of the interior of the vehicle 40 and the report from the user 11. The evaluation is quantified as a point. The method for the evaluation is not limited to this, and may be freely set. Further, the number of points to be given are not limited to numbers described below, and may be freely set.

First, the control unit 21 evaluates the user 11 based on whether the acquired report information includes the report from the user 11. In the case where the report information includes the report, the control unit 21 decides to give 1 point to the user 11, and in the case where the report information does not include the report, the control unit 21 decides to subtract 1 point, that is, to give −1 point. For example, from the first, second and fourth lines in FIG. 6, the control unit 21 determines that the report information received from the terminal device 30 of each of the user 11A, the user 11B and the user 11D includes the report information. The control unit 21 decides to give 1 point to the user 11A, the user 11B and the user 11D. From the third line in FIG. 6, the control unit 21 determines that the report information received from the terminal device 30 of the user 11C does not include the report, and decides to give −1 point to the user 11C.

Next, the control unit 21 evaluates the user 11 based on whether the change that is the change in the state of the interior of the vehicle 40 and that is detected based on the comparison between the first image and the second image coincides with the content of the report from the user 11. In the case where the detected change shown in FIG. 4 coincides with the content of the report from the user 11 shown in FIG. 6, the control unit 21 decides to give 1 point to the user 11, and in the case where the detected change does not coincide with the content of the report from the user 11, the control unit 21 decides not to give any point, that is, to give 0 points. For example, the control unit 21 compares each line in FIG. 6 with the corresponding line in FIG. 4, and determines whether the detected change coincides with the content of the report from the user 11. The row with the title "STATE BEFORE USE" in FIG. 6 corresponds to a row with a title "FIRST IMAGE" in FIG. 4, and the row with the title "STATE AFTER USE" in FIG. 6 corresponds to a row with a title "SECOND IMAGE" in FIG. 4.

The first line in FIG. 6 indicates the report of "there was no damage before the use of the vehicle 40A, but there was a damage on the seating surface of the passenger's seat after the use". The content of the report coincides with the detected change recorded on the first line in FIG. 4, that is, "the increase in damage as the state of the interior of the vehicle 40A". Therefore, the control unit 21 determines that the detected change coincides with the content of the report from the user 11. Therefore, the control unit 21 decides to give 1 point to the user 11A. Similarly, the control unit 21 determines that the content of the report on the second line in FIG. 6 coincides with the detected change on the second line in FIG. 4. Therefore, the control unit 21 decides to give 1 point to the user 11B. The third line in FIG. 6 indicates that the report information does not include the report. The control unit 21 cannot determine whether the change recorded on the third line in FIG. 4 coincides with the content of the report, and therefore, decides to give 0 points to the user 11C. The fourth line in FIG. 6 indicates a report that there was a damage on a door glass on the passenger's seat side both before the use of the vehicle 40B and after the use of the vehicle 40B. However, the fourth line in FIG. 4 indicates that no damage was detected from the first image and the second image. Therefore, the control unit 21 determines that the detected change does not coincide with the content of the report from the user 11. Therefore, the control unit 21 decides to give 0 points to the user 11D.

The control unit 21 evaluates the user 11 based on whether the change detected by the comparison between the first image and the second image is a deterioration. In the case where the detected change is not a deterioration, the control unit 21 decides to give 1 point to the user 11, and in the case where the detected change is a deterioration, the control unit 21 decides not to give any point, that is, to give 0 points. For example, the control unit 21 determines that the change in the state of the interior of each of the vehicle 40A and the vehicle 40B recorded on the second line and the fourth line in FIG. 4 is not a deterioration because the damage is not increased. Therefore, the control unit 21 decides to give 1 point to each of the user 11B and the user 11D. On the other hand, the control unit 21 determines that the change in the state of the interior of the vehicle 40A recorded on the first line and the third line in FIG. 4 is a deterioration because the damage is increased. Therefore, the control unit 21 decides to give 0 points to each of the user 11A and the user 11C.

The control unit 21 sums the decided number of points, and finally decides the number of points to be given. For example, the control unit 21 finally decides that the number of points to be given to the user 11A is 2 points resulting from the summing.

The control unit 21 refers to the user information table stored in the storage unit 22. The control unit 21 updates the information indicating the total possessed point of the user 11 and included in the user information table, by adding the finally decided number of points. For example, suppose that the number of points of the user 11A that is finally decided is 2 points and the total possessed point of the user 11A is 30. The control unit 21 adds 2 points finally decided, and updates the total possessed point of the user 11 to 32. The control unit 21 stores the user information table after the update, in the storage unit 22.

The control device 20 may send a notice indicating the finally decided number of points and the total number of possessed points after the update, to the terminal device 30. In this way, the control unit 21 sends a notice indicating the result of the evaluation of the user 11, to the terminal device 30. The control unit 31 of the terminal device 30 receives the notice through a communication unit 33. The control unit 31 displays the notice to the user 11 through the output unit 35. Thereby, the user 11 can know the number of points added by this use and the current total number of possessed points of the user 11. The control device 20 may send the information indicating the total number of possessed points, to the terminal device 30, periodically or in response to a request from the terminal device 30.

The total number of possessed points may be used when the business operator that provides the car-sharing service decides a member rank of the user 11. The member rank may be freely used depending on the policy of the business operator that provides the car-sharing service. For example, depending on the rank, the level of the priority of the reservation may be changed, or the rate of the point to be given may be changed. The total number of possessed points may be freely used depending on the policy of the business operator that provides the car-sharing service. For example, the service may be restricted for the user 11 having a lower number of points than a predetermined number.

The storage unit 22 includes at least one semiconductor memory, at least one magnetic memory, at least one optical memory, or a combination of at least two kinds of the memories. For example, the semiconductor memory is a RAM or a ROM. The "RAM" is an abbreviation of random-access memory. The "ROM" is an abbreviation of read-only memory. For example, the RAM is a SRAM or a DRAM. The "SRAM" is an abbreviation of static random-access memory. The "DRAM" is an abbreviation of dynamic random-access memory. For example, the ROM is an EEPROM. The "EEPROM" is an abbreviation of electrically erasable programmable read-only memory. For example, the storage unit 22 functions as a main storage device, an auxiliary storage device or a cache memory. The storage unit 22 stores information to be used for the operation of the control device 20 and information obtained by the operation of the control device 20. The storage unit 22 stores a system program, an application program, the information indicating the result of the comparison between the first image and the second image, the report information, the reservation information table, the vehicle information table, the user information table, and others.

The communication unit 23 includes at least one communication interface. For example, the communication interface is a LAN interface. The communication unit 23 receives the information to be used for the operation of the control device 20, and sends the information obtained by the operation of the control device 20.

The input unit 24 includes at least one input interface. For example, the input interface is a physical key, a capacitive key, a pointing device, a touch screen provided integrally with a display, or a microphone. The input unit 24 accepts an operation for inputting the information to be used for the operation of the control device 20. The input unit 24 may be connected to the control device 20 as an external input device, instead of being included in the control device 20. As the connection scheme, for example, an arbitrary scheme such as USB, HDMI® or Bluetooth® can be used. The "USB" is an abbreviation of Universal Serial Bus. The "HDMI®" is an abbreviation of High-Definition Multimedia Interface.

The output unit 25 includes at least one output interface. For example, the output interface is a display or a speaker. For example, the display is an LCD or an organic EL display. The "LCD" is an abbreviation of liquid crystal display. The "EL" is an abbreviation of electroluminescence. The output unit 25 outputs the information obtained by the operation of the control device 20. The output unit 25 may be connected to the control device 20 as an external output device, instead of being included in the control device 20. As the connection scheme, for example, an arbitrary scheme such as USB, HDMI® or Bluetooth® can be used.

The function of the control device 20 is realized when a control program according to the embodiment is executed by a processor corresponding to the control unit 21. That is, the function of the control device 20 is realized by software. The control program causes a computer to execute an operation of the control device 20, and thereby causes the computer to function as the control device 20. That is, the computer functions as the control device 20 by executing the operation of the control device 20 in accordance with the control program.

The program can be recorded in a non-transitory computer-readable medium. For example, the non-transitory computer-readable medium is a magnetic recording device, an optical disc, a magneto-optical recording medium, or a semiconductor memory. For example, the program is distributed by selling, transferring or lending of a portable recording medium such as a DVD or CD-ROM in which the program is recorded. The "DVD" is an abbreviation of digital versatile disc. The "CD-ROM" is an abbreviation of compact disc read-only memory. The program may be distributed by storing the program in a storage of a server and transferring the program from the server to other computers. The program may be provided as a program product.

For example, the computer once stores the program recorded in the portable recording medium or the program transferred from the server, in the main storage device. Then, the computer reads the program stored in the main storage device, with the processor, and executes a process in accordance with the read program, with the processor. The computer may directly read the program from the portable recording medium, to execute the process in accordance with the program. The computer may execute a process in accordance with the received program whenever the program is transferred from the server to the computer. Without the transfer of the program from the server to the computer, the process may be executed by a so-called ASP-type service in which the function is realized only by execution instruction and result acquisition. The "ASP" is an abbreviation of application service provider. The program includes information that is used for a process by an electronic computer and that is similar to a program. For example, data that is not a command to be directly given to the computer but has a property of defining the process of the computer is included in the "information that is similar to a program".

Some or all of the functions of the control device 20 may be realized by a dedicated circuit corresponding to the control unit 21. That is, some or all of the functions of the control device 20 may be realized by hardware.

The configuration of the terminal device 30 according to the embodiment will be described with reference to FIG. 2. The terminal device 30 includes the control unit 31, a storage unit 32, the communication unit 33, an input unit 34 and the output unit 35.

The control unit 31 includes at least one processor, at least one dedicated circuit, or a combination of them. The processor is a general-purpose processor such as a CPU or a GPU, or a dedicated processor for a particular process. For example, the dedicated circuit is an FPGA or an ASIC. The control unit 31 executes processes relevant to the operation of the terminal device 30, while controlling each unit of the terminal device 30. In this example, the control unit 31 creates the report information based on the input from the user 11. The control unit 31 sends the report information to the control device 20. The report information includes the report about the change in the state of the interior of the vehicle 40 and the user identifier of the user 11.

The storage unit 32 includes at least one semiconductor memory, at least one magnetic memory, at least one optical memory, or a combination of at least two kinds of the memories. For example, the semiconductor memory is a RAM or a ROM. For example, the RAM is a SRAM or a DRAM. For example, the ROM is an EEPROM. For example, the storage unit 32 functions as a main storage device, an auxiliary storage device or a cache memory. The storage unit 32 stores information to be used for the operation of the terminal device 30 and information obtained by the operation of the terminal device 30.

The communication unit 33 includes at least one communication interface. For example, the communication interface is an interface corresponding to a mobile communication standard such as LTE, the 4G standard or the 5G standard, an interface corresponding to a short-range wireless communication such as Bluetooth®, or a LAN interface. The "LTE" is an abbreviation of Long Term Evolution. The "4G" is an abbreviation of 4-th generation. The "5G" is an abbreviation of 5-th generation. The communication unit 33 receives the information to be used for the operation of the terminal device 30, and sends the information obtained by the operation of the terminal device 30.

The input unit 34 includes at least one input interface. For example, the input interface is a physical key, a capacitive key, a pointing device, a touch screen provided integrally with a display, or a microphone. The input unit 34 accepts an operation for inputting the information to be used for the operation of the terminal device 30. The input unit 34 may be connected to the terminal device 30 as an external input device, instead of being included in the terminal device 30. As the connection scheme, for example, an arbitrary scheme such as USB, HDMI® or Bluetooth® can be used.

The output unit 35 includes at least one output interface. For example, the output interface is a display, a speaker or a vibrating motor. For example, the display is an LCD or an organic EL display. The output unit 35 outputs the information obtained by the operation of the terminal device 30. The output unit 35 may be connected to the terminal device 30 as an external output device, instead of being included in the terminal device 30. As the connection scheme, for example, an arbitrary scheme such as USB, HDMI® or Bluetooth® can be used.

The function of the terminal device 30 is realized when a terminal program according to the embodiment is executed by a processor corresponding to the control unit 31. That is, the function of the terminal device 30 is realized by software. The terminal program causes a computer to execute the operation of the terminal device 30, and thereby causes the computer to function as the terminal device 30. That is, the computer functions as the terminal device 30 by executing the operation of the terminal device 30 in accordance with the terminal program.

Some or all of the functions of the terminal device 30 may be realized by a dedicated circuit corresponding to the control unit 31. That is, some or all of the functions of the terminal device 30 may be realized by hardware.

The configuration of the vehicle 40 according to the embodiment will be described with reference to FIG. 2. As shown in FIG. 2, the vehicle 40 includes a control unit 41, a storage unit 42, a communication unit 43, an input unit 44, an output unit 45 and the photographing unit 46.

Each of the control unit 41, the storage unit 42, the communication unit 43, the input unit 44, the output unit 45 and the photographing unit 46 may be built in the vehicle 40, or may be provided in the vehicle 40 in a detachable manner. Some or all of the control unit 41, the storage unit 42, the communication unit 43, the input unit 44, the output unit 45 and the photographing unit 46 may be built in a general-purpose device such as a smartphone, a tablet terminal or a navigation device, for example, and may be connected to an on-board network in a communicable manner. The control unit 41, the storage unit 42, the communication unit 43, the input unit 44, the output unit 45 and the photographing unit 46 may be connected to an on-board network such as Controller Area Network (CAN) in a communicable manner.

The control unit 41 includes at least one processor, at least one dedicated circuit, or a combination of them. The processor is a general-purpose processor such as a CPU or a GPU, or a dedicated processor for a particular process. For example, the dedicated circuit is an FPGA or an ASIC. The control unit 41 executes processes relevant to the operation of the vehicle 40, while controlling each unit of the vehicle 40.

The control unit 41 determines where the user 11 has arrived in the vicinity of the vehicle 40. The determination may be performed by an arbitrary method. For example, in the case where the control unit 41 has received the authentication information from the terminal device 30, the control unit 41 may determine that the user 11 has arrived in the vicinity of the vehicle 40.

In the case where the control unit 41 determines that the user 11 has arrived in the vicinity of the vehicle 40, the control unit 41 controls the photographing unit 46 such that the photographing unit 46 photographs the state of the interior of the vehicle 40. The control unit 41 acquires the image photographed by the photographing unit 46, as the first image. The control unit 41 sends the acquired first image to the control device 20 through the communication unit 43. Furthermore, the control unit 41 sends the vehicle identifier of the vehicle 40 to the control device 20.

The control unit 41 determines whether the user 11 has got out of the vehicle 40. The determination may be performed by an arbitrary method. For example, in the case where the control unit 41 has received the instruction to invalidate the authentication information from the control device 20, the control unit 41 may determine that the user 11 has got out of the vehicle 40.

In the case where the control unit 41 determines that the user 11 has got out of the vehicle 40, the control unit 41 controls the photographing unit 46 such that the photographing unit 46 photographs the state of the interior of the vehicle 40. The control unit 41 acquires the image photographed by the photographing unit 46, as the second image. The control unit 41 sends the acquired second image to the control device 20 through the communication unit 43. Furthermore, the control unit 41 sends the vehicle identifier of the vehicle 40 to the control device 20.

The storage unit 42 includes at least one semiconductor memory, at least one magnetic memory, at least one optical memory, or a combination of at least two kinds of the memories. For example, the semiconductor memory is a RAM or a ROM. For example, the RAM is a SRAM or a DRAM. For example, the ROM is an EEPROM. For example, the storage unit 42 functions as a main storage device, an auxiliary storage device or a cache memory. The storage unit 42 stores information to be used for the operation of the vehicle 40 and information obtained by the operation of the vehicle 40. The storage unit 42 stores a system program, an application program, the authentication information sent from the control device 20, and others.

The communication unit 43 includes at least one communication interface. For example, the communication interface is an interface corresponding to a mobile communication standard such as LTE, the 4G standard or the 5G standard. For example, an on-board communication device such as a Data Communication Module (DCM) may function as the communication unit 43. The communication unit 43 receives the information to be used for the operation of the vehicle 40, and sends the information obtained by the operation of the vehicle 40.

The input unit 44 includes at least one input interface. For example, the input interface is a physical key, a capacitive key, a pointing device, a touch screen provided integrally with a display, or a microphone. The input unit 44 accepts an operation for inputting the information to be used for the operation of the vehicle 40. The input unit 44 may be connected to the vehicle 40 as an external input device, instead of being included in the vehicle 40. As the connection scheme, for example, an arbitrary scheme such as USB, HDMI® or Bluetooth® can be used.

The output unit 45 includes at least one output interface. For example, the output interface is a display, a speaker or a vibrating motor. For example, the display is an LCD or an organic EL display. The output unit 45 outputs the information obtained by the operation of the vehicle 40. The output unit 45 may be connected to the vehicle 40 as an external output device, instead of being included in the vehicle 40. As the connection scheme, for example, an arbitrary scheme such as USB, HDMI® or Bluetooth® can be used.

The photographing unit 46 includes one or more on-board cameras. Specifically, as the on-board camera, for example, an in-vehicle camera can be used. The in-vehicle camera can photograph the state of the interior of the vehicle 40. In the embodiment, the in-vehicle camera is fixed to the ceiling surface of the vehicle cabin. The position of the in-vehicle camera is not limited to this, and may be freely set. For example, the in-vehicle camera may be fixed to the instrument panel. A range that can be photographed by the in-vehicle camera includes a driver's seat, a passenger's seat, rear seats and foot spaces of the seats. The in-vehicle camera may include a wide-angle lens. Thereby, the in-vehicle camera can photograph the inside or door glass of the door at each seat. The in-vehicle camera may rotate. Thereby, the in-vehicle camera can photograph the interior of the vehicle 40 at an arbitrary angle. In the embodiment, an example in which one in-vehicle camera is provided is shown, but the number of in-vehicle cameras may be freely decided.

In the case where it is determined that the user 11 has arrived in the vicinity of the vehicle 40, the photographing unit 46 photographs the state of the interior of the vehicle 40. The image is acquired by the control unit 41 as the first image. Further, in the case where it is determined that the user 11 has got out of the vehicle 40, the photographing unit 46 photographs the state of the interior of the vehicle 40. The photographed image is acquired by the control unit 41 as the second image.

Figure 7A:
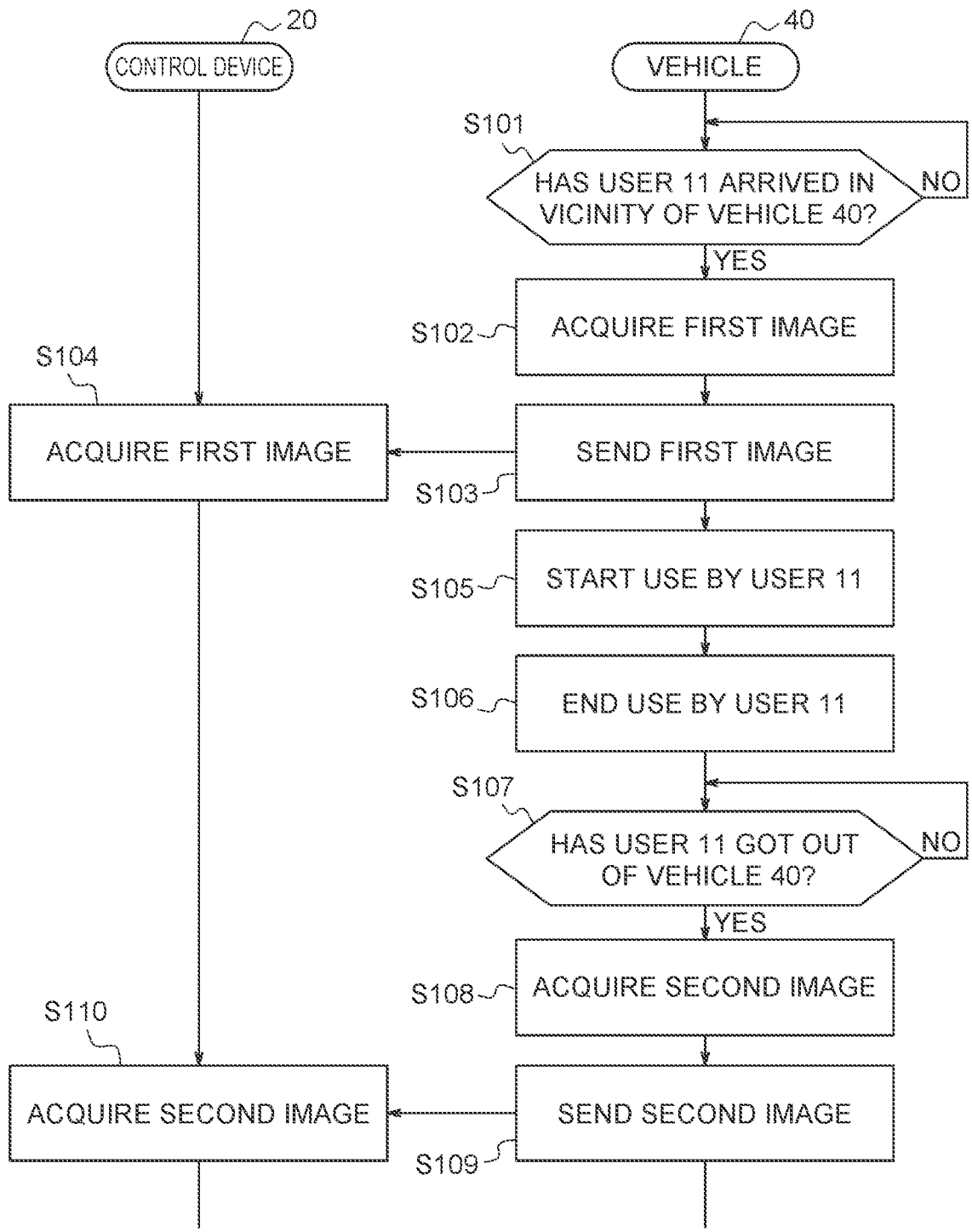
FIG. 7A is a diagram showing an operation of the system according to the embodiment.
Figure 7B:
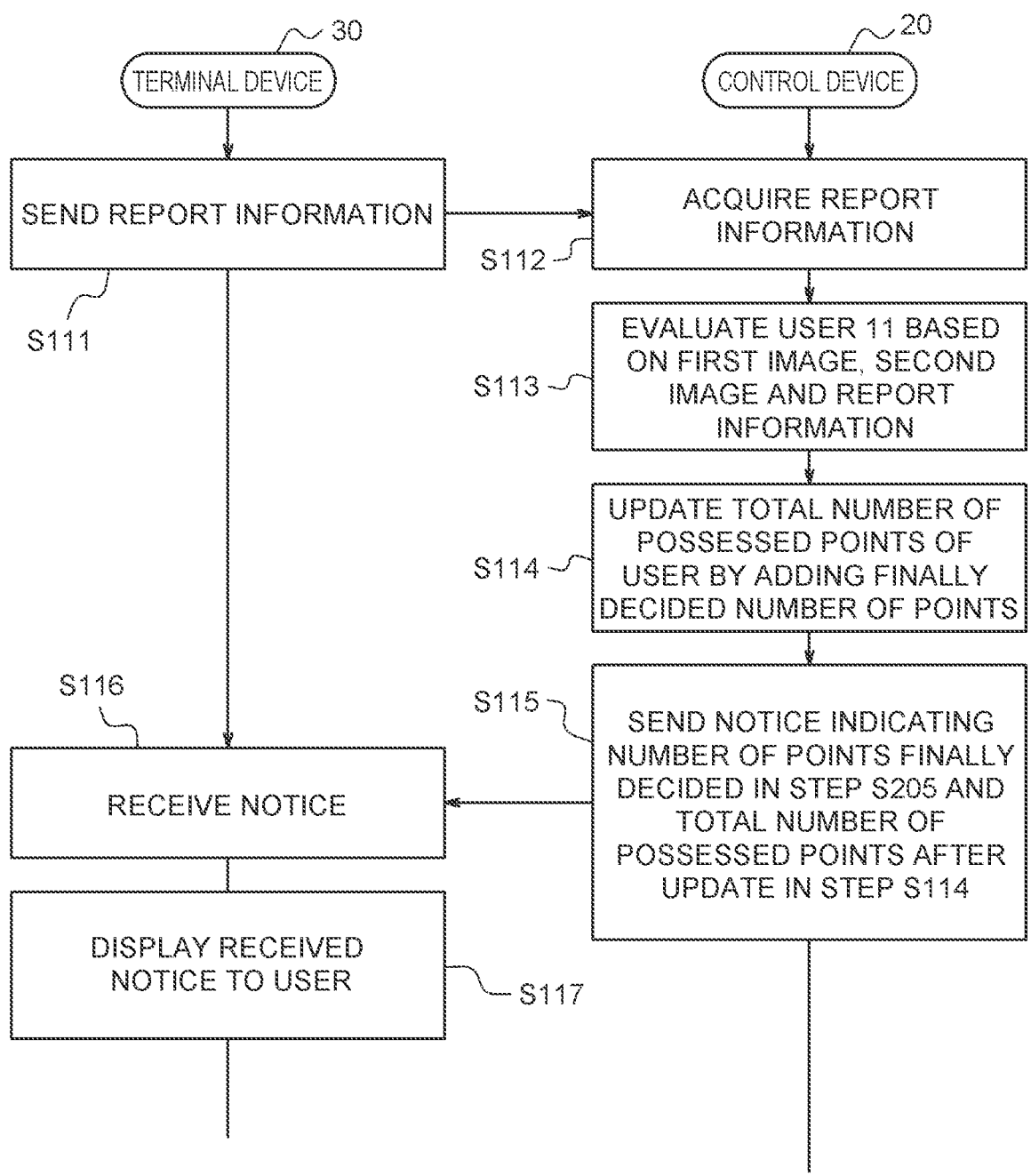
FIG. 7B is a diagram showing an operation of the system according to the embodiment.
Figure 8:
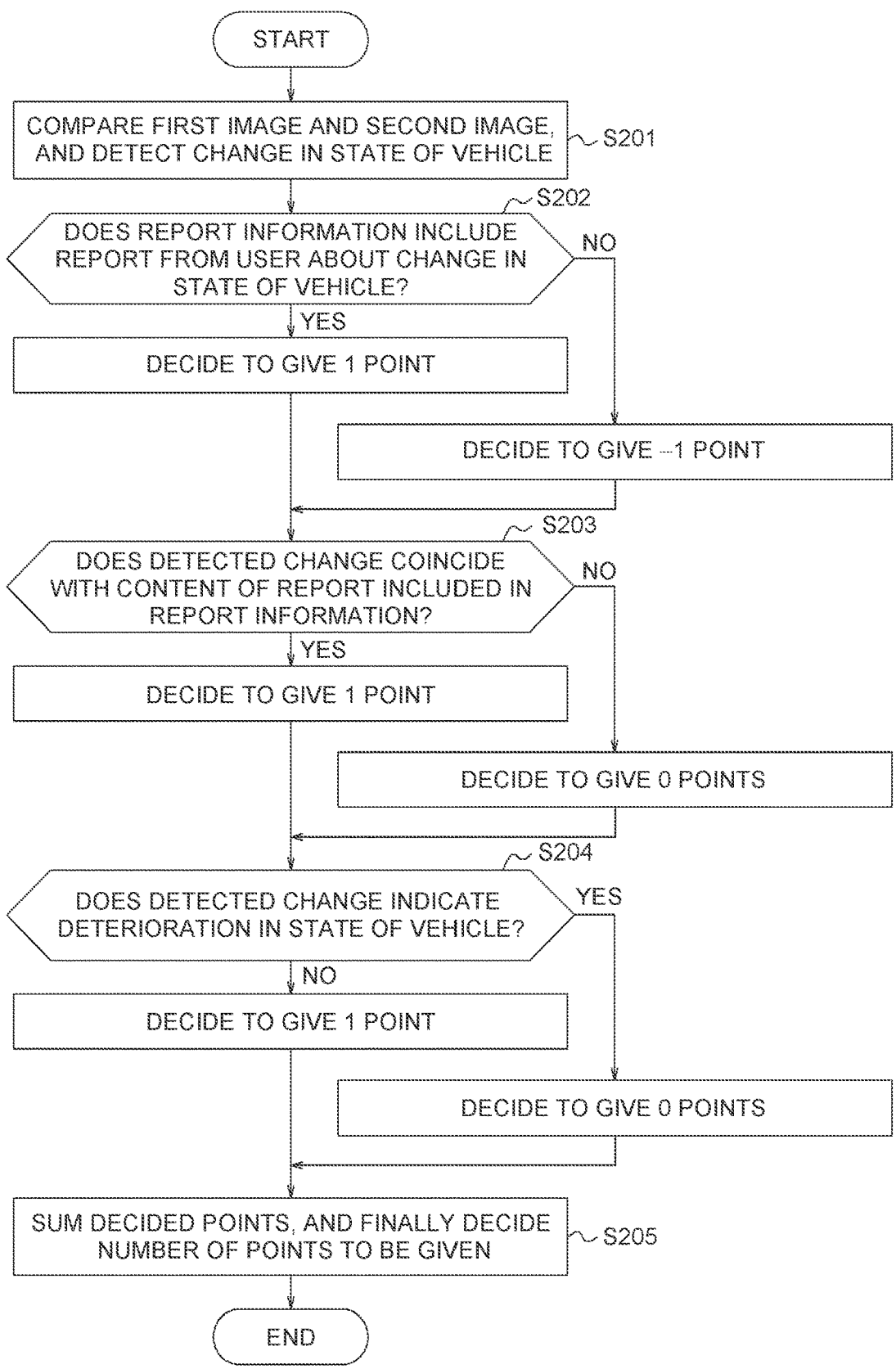
FIG. 8 is a diagram showing an operation of a control unit of the control device according to the embodiment.

The operation of the system 10 according to the embodiment will be described with reference to FIG. 3A, FIG. 3B, FIG. 7A, FIG. 7B and FIG. 8. This operation corresponds to a control method according to the embodiment. In this example, the user 11 reserves the use of the vehicle 40, using the car-sharing service. For simplification, FIG. 7A and FIG. 7B show one vehicle 40, one terminal device 30 and one user 11. FIG. 7A and FIG. 7B show a processing flow of the whole of the system 10 according to the embodiment. FIG. 8 shows the operation of the control unit 21 of the control device 20.

In step S101 in FIG. 7A, the vehicle 40 determines whether the user 11 has arrived in the vicinity of the vehicle 40. The determination may be performed by an arbitrary method. In this example, when the control unit 41 of the vehicle 40 has received the authentication information from the terminal device 30, the control unit 41 of the vehicle 40 determines that the user 11 has arrived in the vicinity of the vehicle 40. When the vehicle 40 determines that the user 11 has arrived in the vicinity of the vehicle 40, the operation of the system 10 proceeds to step S102.

In step S102, the vehicle 40 acquires the first image after photographing the state of the interior of the vehicle 40. In this example, the photographing unit 46 of the vehicle 40 photographs the state of the interior of the vehicle 40. The control unit 41 of the vehicle 40 acquires the image photographed by the photographing unit 46, as the first image.

In step S103, the vehicle 40 sends the first image to the control device 20. In this example, the control unit 41 sends the acquired first image to the control device 20 through the communication unit 43.

In step S104, the control device 20 acquires the first image from the vehicle 40. In this example, the control unit 21 of the control device 20 acquires the first image by receiving the first image through the communication unit 23. The control unit 21 stores the acquired first image in the storage unit 22.

In step S105, the use of the vehicle 40 by the user 11 is started. In this example, the user 11 starts the vehicle 40, and starts driving.

In step S106, the use of the vehicle 40 by the user 11 is ended. In this example, the user 11 stops the vehicle 40, and ends driving.

In step S107, the vehicle 40 determines whether the user 11 has got out of the vehicle 40. The determination may be performed by an arbitrary method. In this example, when the control unit 41 of the vehicle 40 has received the instruction to invalidate the authentication information from the control device 20, the control unit 41 of the vehicle 40 determines that the user 11 has got out of the vehicle 40. When the control unit 41 of the vehicle 40 determines that the user 11 has got out of the vehicle 40, the operation of the system 10 proceeds to step S108.

In step S108, the vehicle 40 acquires the second image by photographing the state of the interior of the vehicle 40. In this example, the photographing unit 46 of the vehicle 40 photographs the state of the interior of the vehicle 40. The control unit 41 of the vehicle 40 acquires the image photographed by the photographing unit 46, as the second image.

In step S109, the vehicle 40 sends the second image to the control device 20. In this example, the control unit 41 sends the acquired second image to the control device 20 through the communication unit 43.

In step S110, the control device 20 acquires the second image from the vehicle 40. In this example, the control unit 21 of the control device 20 acquires the second image by receiving the second image through the communication unit 23. The control unit 21 stores the acquired second image in the storage unit 22.

In step S111, the terminal device 30 sends the report information to the control device 20. In this example, the control unit 31 of the terminal device 30 accepts the input from the user 11 through the input unit 34. In this example, the report information includes the report from the user 11, "there was no damage before the use of the vehicle 40, but there was a damage on the seating surface of the passenger's seat after the use". The control unit 31 creates the report information including the report and the user identifier of the user 11, and sends the report information to the control device 20 through the communication unit 33.

In step S112, the control device 20 acquires the report information from the terminal device 30. In this example, the control unit 21 of the control device 20 acquires the report information by receiving the report information through the communication unit 23. The control unit 21 stores the acquired report information in the storage unit 22.

In step S113, the control device 20 evaluates the user 11 based on the acquired first image, second image and report information. In this example, the control unit 21 evaluates the user 11 by referring to the first image, second image and report information stored in the storage unit 22.

FIG. 8 shows a specific processing flow of the evaluation by the control unit 21 in step S113 of FIG. 7B.

First, in step S201, the control unit 21 compares the acquired first image and second image, and detects the change in the state of the interior of the vehicle 40. In this example, the control unit 21 compares the first image shown in FIG. 3A and the second image shown in FIG. 3B. The control unit 21 recognizes the scratch S on the seating surface of the passenger's seat, in the second image. The scratch S is not recognized in the first image. The control unit 21 detects the change, "the increase in damage as the state of the interior of the vehicle 40". The control unit 21 stores the detected result in the storage unit 22.

In step S202, the control unit 21 determines whether the acquired report information includes the report from the user 11 about the change in the state of the interior of the vehicle 40. In the case where the report information includes the report, the control unit 21 decides to give 1 point to the user 11. In the case where the report information does not include the report, the control unit 21 decides to subtract 1 point, that is, to give −1 point. In this example, the acquired report information includes the report from the user 11. Therefore, the control unit 21 decides to give 1 point to the user 11.

In step S203, the control unit 21 determines whether the change detected in step S201 coincides with the content of the report included in the report information. In the case where the change detected in step S201 coincides with the content of the report included in the report information, the control unit 21 decides to give 1 point to the user 11. In the case where the change detected in step S201 does not coincide with the content of the report included in the report information, the control unit 21 decides not to give any point to the user 11, that is, to give 0 points. In this example, the change detected in step S201, that is, "the increase in damage as the state of the interior of the vehicle 40" coincides with the content of the report from the user 11, that is, "there was no damage before the use of the vehicle 40, but there was a damage on the seating surface of the passenger's seat after the use". Therefore, the control unit 21 decides to give 1 point to the user 11.

In step S204, the control unit 21 determines whether the change detected in step S201 is the deterioration in the state of the interior of the vehicle 40. In the case where the detected change is not the deterioration in the state of the interior of the vehicle 40, the control unit 21 decides to give 1 point to the user 11. In the case where the detected change is the deterioration in the state of the interior of the vehicle 40, the control unit 21 decides not to give any point to the user 11, that is, to give 0 points. In this example, the change detected in step S201 is the increase in damage in the interior of the vehicle 40, and the deterioration in the state of the interior of the vehicle 40. Therefore, the control unit 21 decides to give 0 points to the user 11.

Next, in step S205, the control unit 21 sums points decided in step S202 to step S204, and finally decides the number of points to be given. In this example, the control unit 21 decides to give 1 point in each of step S202 and step S203, and decides to give 0 points in step S204. Therefore, the control unit 21 sums the points, and finally decides to give 2 points to the user 11. Then, the process for the evaluation by the control unit 21 ends.

Back to FIG. 7B, next, in step S114, the control unit 21 updates the total number of possessed points of the user, by adding the number of points finally decided in step S205. In this example, first, the control unit 21 refers to the information included in the user information table stored in the storage unit 22 and indicating the total possessed point of the user 11. Here, suppose that the total possessed point of the user 11 is 30. The control unit 21 adds 2 points finally decided in step S205, and updates the total possessed point to 32 of the user 11. The control unit 21 stores the user information table after the update, in the storage unit 22.

In step S115, the control unit 21 sends the notice indicating the number of points finally decided in step S205 and the total number of possessed points after the update in step S114, to the terminal device 30. In this way, the control unit 21 sends the notice indicating the result of the evaluation of the user 11, to the terminal device 30. In this example, the control unit 21 sends a notice indicating that the finally decided number of points is 2 and the total number of possessed points after the update is 32, to the terminal device 30, through the communication unit 23.

In step S116, from the control device 20, the terminal device 30 receives the notice indicating the finally decided number of points and the total number of possessed points after the update. In this example, the control unit 31 of the terminal device 30 receives the notice through the communication unit 33.

In step S117, the control unit 31 displays the received notice to the user 11. In this example, through the output unit 35, the control unit 31 displays the notice indicating that the finally decided number of points is 2 and the total number of possessed points is 32, to the user 11. Thereby, the user 11 can recognize the number of points added by this use and the current total number of possessed points of the user 11.

As described above, the control device 20 according to the embodiment includes the control unit 21 configured to acquire the first image resulting from photographing the vehicle 40 before the user 11 gets in the vehicle 40, the second image resulting from photographing the vehicle 40 after the user 11 gets out of the vehicle 40, and the report information that is relevant to the change in the state of the vehicle and that is reported by the user 11, to detect the change in the state of the vehicle 40 based on the first image and the second image, and to evaluate the user 11 based on the detected change and the report information.

The control unit 21 of the control device 20 can accurately detect the change in the state of the vehicle 40, by comparing the acquired first image and second image. The control unit 21 can comprehensively evaluate the user 11, by using the detected change as an objective evaluation and using the report information from the user 11 as a subjective evaluation. Accordingly, it is possible to enhance the quality of the evaluation of the user 11.

As described above, the change includes the appearance of the damage of the vehicle 40.

The control unit 21 can detect the appearance of the damage of the vehicle 40, as the change. When it is possible to accurately detect the appearance of the damage, it is easy to objectively determine the situation of the use of the vehicle 40 by the user 11. Accordingly, it is possible to enhance the quality of the evaluation of the user 11.

As described above, the control unit 21 evaluates the user 11 based on whether the report information includes the report about the change from the user 11.

When the report information includes the report input by the user 11, the control unit 21 more highly evaluates the user 11 than when the report information does not include the report. Therefore, the user 11 has higher motivation to report the state of the vehicle 40, so that the user 11 is likely to report the state of the vehicle 40. Therefore, it is easy to evaluate the user 11 based on the report from the user 11, and it is possible to enhance the quality of the evaluation of the user 11.

As described above, the control unit 21 evaluates the user 11 based on whether the detected change coincides with the content of the report.

When the detected change coincides with the content of the report from the user 11, the control unit 21 more highly evaluates the user 11 than when the detected change does not coincide with the content of the report from the user 11. Therefore, the user 11 has higher motivation to exactly report the state of the vehicle 40, so that the user 11 is likely to perform an exact and honest report. Therefore, it is easy to evaluate the user 11 based on the exact and honest report from the user 11, and it is possible to enhance the quality of the evaluation of the user 11.

As described above, the control unit 21 evaluates the user 11 based on whether the detected change is the deterioration in the state of the vehicle 40.

When the detected change is not the deterioration in the state of the vehicle 40, the control unit 21 more highly evaluates the user 11 than when the detected change is the deterioration in the state of the vehicle 40. Therefore, the user 11 has higher motivation to use the vehicle 40 while maintaining the state of the vehicle 40, so that the user 11 is likely to properly use the vehicle 40. The opportunity of the appearance of the damage in the vehicle 40 decreases, and therefore a period during which the vehicle 40 cannot be used due to the repair decreases, so that it is easy to smoothly operate the car-sharing service. Further, it is easy to evaluate the user 11 based on the result of the objective detection of the state of the vehicle 40. Accordingly, it is possible to enhance the quality of the evaluation of the user 11.

As described above, the control device 20 further includes the communication unit 23 that communicates with the terminal device 30 of the user 11. The control unit 21 sends the notice indicating the result of the evaluation of the user 11, to the terminal device 30, through the communication unit 23.

The terminal device 30 receives the notice indicating the result of the evaluation of the user 11, from the control device 20. The terminal device 30 gives the notice of the result of the evaluation, to the user 11. Thereby, the user 11 can recognize whether the way to use the vehicle 40 and the report after the use are proper. Then, the user 11 has higher motivation to properly use the vehicle 40 and properly perform the report after the use, at the time of subsequent uses. Therefore, the user 11 is likely to perform the report. Accordingly, it is easy to evaluate the user 11 based on the report from the user 11, and it is possible to enhance the quality of the evaluation of the user 11.

Modification 1

As a modification of the embodiment, the control unit 21 of the control device 20 may further evaluate the user 11 based on whether the report information includes a change that is the change in the state of the vehicle 40 and that is not detected based on the first image and the second image.

In the modification, the report information includes a report relevant to a change in the state of the vehicle 40 from the user 11. The change is a change that is not detected by the control unit 21 based on the first image and the second image. In this case, for example, the control unit 21 decides to give 2 points to the user 11. In this way, the number of points to be given in the modification is higher than the number of points to be given when the change detected by the control unit 21 coincides with the content of the report from the user 11 in the above-described embodiment. Similarly to the above-described embodiment, the control unit 21 can add the decided number of points to the total possessed point of the user 11.

In the modification, the control unit 21 may decide to give the point to the user 11 after the control unit 21 determines that the change reported by the user 11 is exact. The determination may be performed by an arbitrary method. For example, in the case where the change detected based on the first image and the second image does not coincide with the content of the report from the user 11, the control device 20 may send inspection request information for requesting an inspection about the change reported by the user 11, to a terminal device of the business operator that provides the car-sharing service. The terminal device receives the inspection request information, and displays the inspection request information to the staff. Suppose that the staff refers to the displayed information, inspects the vehicle 40, and determines that the report from the user 11 is exact as a result of the inspection. In this case, the staff sends information indicating that the report is exact, to the control device 20, using the terminal device. The control unit 21 of the control device 20 may decide to give 2 points to the user 11 after receiving the information. Without being limited to this, for example, the inspection request information may be sent to a terminal device that is used by a subsequent user different from the user 11. Suppose that the subsequent user inspects the vehicle 40 and determines that the report from the user 11 is exact as a result of the inspection. In this case, the subsequent user may send information indicating that the report is exact, to the control device 20, using the terminal device of the subsequent user.

As described above, when the report information includes the change that is the change in the state of the vehicle 40 and that is not detected based on the first image and the second image, the control unit 21 more highly evaluates the user 11 than when the detected change coincides with the content of the report.

The user 11 becomes conscious of being highly evaluated when the user 11 reports the change that cannot be detected based on the first image and the second image. Therefore, the user 11 has higher motivation to exactly report the state of the vehicle 40, so that the user 11 is likely to exactly report the state of the vehicle 40. For example, the user 11 checks even a portion that is hard to be photographed by the photographing unit 46 of the vehicle 40, and performs the report. Thus, it is easy to evaluate the user 11 based on the exact report from the user 11, and it is possible to enhance the quality of the evaluation of the user 11. Further, it is easy to find the damage of the vehicle 40 that cannot be detected based on the first image and the second image, and therefore, it is easy to keep the vehicle 40 in a good state, and to smoothly operate the car-sharing service.

Modification 2

As a modification of the embodiment, the control unit 21 of the control device 20 may further acquire check information indicating a result of check of the state of the vehicle 40 by a subsequent user different from the user 11, and may evaluate the user 11 based on the check information. In the modification, after the user 11 gets out of the vehicle 40, the subsequent user gets in the same vehicle 40. In the modification, the user 11 is referred to as a precedent user, for a clear description.

When the subsequent user gets in the vehicle 40, the subsequent user checks the state of the vehicle 40, and inputs the result of the check, to the terminal device 30 that is used by the subsequent user. The state of the vehicle 40 that is checked includes the existence of the damage of car trims and others of the vehicle 40. In addition, the state of the vehicle 40 that is checked may include whether the position of the seat is the regular position, whether there is trash, and the like. The control unit 31 of the terminal device 30 sends the input information to the control device 20 as the check information.

The control unit 21 of the control device 20 acquires the check information by receiving the check information. The control unit 21 compares the acquired check information with the second image photographed after the precedent user gets out of the vehicle 40. For example, in the case where the check information indicates that there is no damage of car trims and others and where the second image indicates that there is no damage of car trims and others, the control unit 21 decides to give 1 point to the precedent user. For example, in the case where the check information indicates that the position of the seat is the regular position and where the second image indicates that the position of the seat is the regular position, the control unit 21 decides to give 1 point to the precedent user. For example, in the case where the check information indicates that there is no trash in the interior of the vehicle 40 and where the second image indicates that there is no trash in the interior of the vehicle 40, the control unit 21 decides to give 1 point to the precedent user. Similarly to the above-described embodiment, the control unit 21 can add the decided number of points to the total possessed point of the precedent user.

In the modification, as described above, the control unit 21 further acquires the check information indicating the result of the check of the state of the vehicle 40 by the subsequent user that is different from the user 11 and that gets in the vehicle 40 after the user 11 gets out of the vehicle 40, and evaluates the user 11 based on the check information.

The user 11 as the precedent user becomes conscious of the influence of the result of the check by the subsequent user on the evaluation. Therefore, the user 11 has higher motivation to properly use the vehicle 40. The opportunity of the appearance of the damage in the vehicle 40 decreases, and therefore the period during which the vehicle 40 cannot be used due to the repair decreases, so that it is easy to smoothly operate the car-sharing service. Further, by acquiring the check information from the subsequent user, the control unit 21 can evaluate the user 11 more objectively. Accordingly, it is possible to enhance the quality of the evaluation of the user 11.

Modification 3

As a modification of the embodiment, the control unit 21 of the control device 20 may further acquire a third image resulting from photographing the vehicle 40 while the user 11 rides in the vehicle 40.

In the modification, the photographing unit 46 of the vehicle 40 photographs the interior of the vehicle 40 while the user 11 rides in the vehicle 40. The control unit 41 of the vehicle 40 acquires the photographed image as the third image. The control unit 41 sends the third image to the control device 20 through the communication unit 43. The timing when the photographing unit 46 photographs the third image may be freely set. The number of third images may be freely decided, and the third image may be an image resulting from photographing a plurality of portions in the interior of the vehicle 40.

The control unit 21 of the control device 20 acquires the third image by receiving the third image. The control unit 21 compares the first image, the second image and the third image, and detects the change in the state of the interior of the vehicle 40. Because of the increase in the image that is compared, the control unit 21 can detect the change more accurately. Thereby, the possibility that the control unit 21 can detect the change increases. For example, the damage that cannot be recognized in the first image and the second image can be recognized in the third image. In the case where the damage in the interior of the vehicle 40 is recognized in the first image and where the damage is not recognized in the second image and the third image, the control unit 21 may analyze the first image again. Further, in addition to the comparison between the first image and the second image, the control unit 21 can detect the change based on the comparison between the first image and the third image or the comparison between the second image and the third image. Thereby, it is possible to detect the timing when the state of the interior of the vehicle 40 changes.

In the modification, as described above, the control unit 21 further acquires the third image resulting from photographing the vehicle 40 while the user 11 rides in the vehicle 40, and detects the change in the state of the vehicle 40, based on the first image, the second image and the third image.

The control unit 21 detects the change in the state of the vehicle 40 based on the third image, in addition to the first image and the second image. Thereby, the control unit 21 can detect the change in the state of the vehicle 40 more accurately compared to the case where the control unit 21 detects the change based on only the first image and the second image. Thus, it is possible to evaluate the user 11 more objectively, and therefore it is possible to enhance the quality of the evaluation of the user 11.

Modification 4

As a modification of the embodiment, the change that is detected from the first image and the second image by the control unit 21 of the control device 20 may include a placement of a personal item of the user 11 in the vehicle 40.

In the modification, when the control unit 21 recognizes the personal item of the user 11 in the second image based on the comparison between the first image and the second image, the control unit 21 detects the existence of the personal item as the change in the state of the interior of the vehicle 40. The personal item recognized in the second image is a lost article of the user 11. The control unit 21 may selectively analyze places that are in the second image and where the user 11 easily loses the personal item, as exemplified by a dashboard and a door pocket.

In the modification, the report information includes a report about whether there is a lost article. For example, in the case where the change detected based on the comparison between the first image and the second image coincides with the content of the report from the user 11, the control unit 21 decides to give 1 point to the user 11. For example, in the case where the control unit 21 determines that there is no personal item of the user 11 in the second image, that is, there is no lost article, based on the comparison between the first image and the second image, the control unit 21 decides to give 1 point to the user 11. Similarly to the above-described embodiment, the control unit 21 can add the decided number of points to the total possessed point of the user 11.

In the case where the control unit 21 detects that there is a personal item of the user 11 in the second image based on the comparison between the first image and the second image, the control unit 21 may send a notice to the terminal device 30. The control unit 31 of the terminal device 30 receives the notice through the communication unit 33. The control unit 31 displays the notice to the user 11 through the output unit 35. Thereby, the user 11 can recognize the lost article in the vehicle 40.

In the modification, as described above, the change includes the placement of the personal item of the user 11 in the vehicle 40.

The user 11 becomes conscious of the influence of the non-existence of the lost article in the vehicle 40 on the evaluation. Therefore, the user 11 has higher motivation to exactly report the state of the vehicle 40, so that the user 11 is likely to exactly perform the report. Therefore, it is easy to evaluate the user 11 based on the exact report, and it is possible to enhance the quality of the evaluation of the user 11. Further, the user 11 has higher motivation to avoid the personal item from being lost in the interior of the vehicle 40. Thereby, it is possible to prevent a situation in which the vehicle 40 cannot be used until the lost article of the user 11 is retrieved. As a result, it is easy to smoothly operate the car-sharing service.

The present disclosure is not limited to the above-described embodiment and modifications. For example, the change that is detected is not limited to the change in the state of the interior of the vehicle 40, and may be the change in the state of the external appearance of the vehicle 40. For example, a plurality of blocks described in the block diagram may be integrated, or one block may be divided. Instead of executing a plurality of steps described in the flowcharts in temporal series in accordance with the description, it is allowable to execute the steps in parallel or in a different order, depending on processing powers of the devices that execute the steps or as necessary. In addition, modifications can be made without departing from the spirit of the present disclosure.

What is claimed is:

1. A control device comprising a control unit configured to:
   determine whether a user arrives at a vehicle;
   upon determination that the user arrives at the vehicle, capture a first image of an interior of the vehicle before the user gets in the vehicle;
   determine whether the user gets out of the vehicle;
   upon determination that the user gets out of the vehicle, capture a second image of the vehicle after the user gets out of the vehicle;

detect a first change in a state of the interior of the vehicle by comparing first luminance values of pixels of the first image to second luminance values of pixels of the second image;
acquire report information indicating a second change in the state of the vehicle based on responses of the user to a plurality of questions regarding the state of the interior of the vehicle;
determine whether the report information includes information about the second change;
upon determination that the report information includes the second change, modify a total number of points assigned to the user;
determine whether the first change coincides with the second change;
upon determination that the first change coincides with the second change, modify the total number of points assigned to the user;
determine whether the first change comprises a deterioration of the vehicle;
upon determination that the first change does not comprise the deterioration of the vehicle, modify the total number of points assigned to the user;
determine whether the second change includes information that is not included in the first change;
upon determination that the second change includes information that is not included in the first change, modify the total number of points assigned to the user; and
evaluate the user based on the total number of points assigned to the user.

2. The control device according to claim 1, wherein the first change includes an appearance of a damage of the vehicle.

3. The control device according to claim 1, wherein when the report information includes a report about the second change that is not detected based on the first image and the second image, the control unit more highly evaluates the user than when the detected first change coincides with a content of the report.

4. The control device according to claim 1, wherein the control unit further acquires check information, the check information indicating a result of check of the state of the vehicle by a subsequent user different from the user, the subsequent user getting in the vehicle after the user gets out of the vehicle, and evaluates the user based on the check information.

5. The control device according to claim 1, wherein:
the control unit further acquires a third image, the third image being an image resulting from photographing the vehicle while the user rides in the vehicle; and
the control unit detects the change of the state of the vehicle based on the first image, the second image and the third image.

6. The control device according to claim 1, further comprising a communication unit configured to communicate with a terminal device of the user, wherein the control unit sends a notice indicating a result of the evaluation of the user, to the terminal device, through the communication unit.

7. A control method that is executed by a control device, the control method comprising:
determining whether a user arrives at a vehicle;
upon determination that the user arrives at the vehicle, capturing a first image of an interior of the vehicle before the user gets in the vehicle;
determining whether the user gets out of the vehicle;
upon determination that the user gets out of the vehicle, capturing a second image of the vehicle after the user gets out of the vehicle;
detecting a first change in a state of the interior of the vehicle by comparing first luminance values of pixels of the first image to second luminance values of pixels of the second image;
acquiring report information indicating a second change in the state of the vehicle based on responses of the user to a plurality of questions regarding the state of the interior of the vehicle;
determining whether the report information includes information about the second change;
upon determination that the report information includes the second change, modifying a total number of points assigned to the user;
determining whether the first change coincides with the second change;
upon determination that the first change coincides with the second change, modifying the total number of points assigned to the user;
determining whether the first change comprises a deterioration of the vehicle;
upon determination that the first change does not comprise the deterioration of the vehicle, modifying the total number of points assigned to the user;
determining whether the second change includes information that is not included in the first change;
upon determination that the second change includes information that is not included in the first change, modifying the total number of points assigned to the user; and
evaluating the user based on the total number of points assigned to the user.

8. The control method according to claim 7, wherein the first change includes an appearance of a damage of the vehicle.

9. The control method according to claim 7, further comprising:
further acquiring check information, the check information indicating a result of check of the state of the vehicle by a subsequent user different from the user, the subsequent user getting in the vehicle after the user gets out of the vehicle; and
evaluating the user based on the check information.

10. A non-transitory computer readable storage medium storing a program that causes a computer to execute an operation comprising:
determining whether a user arrives at a vehicle;
upon determination that the user arrives at the vehicle, capturing a first image of an interior of the vehicle before the user gets in the vehicle;
determining whether the user gets out of the vehicle;
upon determination that the user gets out of the vehicle, capturing a second image of the vehicle after the user gets out of the vehicle;
detecting a first change in a state of the interior of the vehicle by comparing first luminance values of pixels of the first image to second luminance values of pixels of the second image;
acquiring report information indicating a second change in the state of the vehicle based on responses of the user to a plurality of questions regarding the state of the interior of the vehicle;
determining whether the report information includes information about the second change;

upon determination that the report information includes the second change, modifying a total number of points assigned to the user;

determining whether the first change coincides with the second change;

upon determination that the first change coincides with the second change, modifying the total number of points assigned to the user;

determining whether the first change comprises a deterioration of the vehicle;

upon determination that the first change does not comprise the deterioration of the vehicle, modifying the total number of points assigned to the user;

determining whether the second change includes information that is not included in the first change;

upon determination that the second change includes information that is not included in the first change, modifying the total number of points assigned to the user; and evaluating the user based on the total number of points assigned to the user.

11. The non-transitory computer readable storage medium according to claim 10, wherein the first change includes an appearance of a damage of the vehicle.

* * * * *